June 26, 1945.    M. SOUDERS, JR    2,379,110
DISTILLATION PROCESS
Filed July 1, 1942
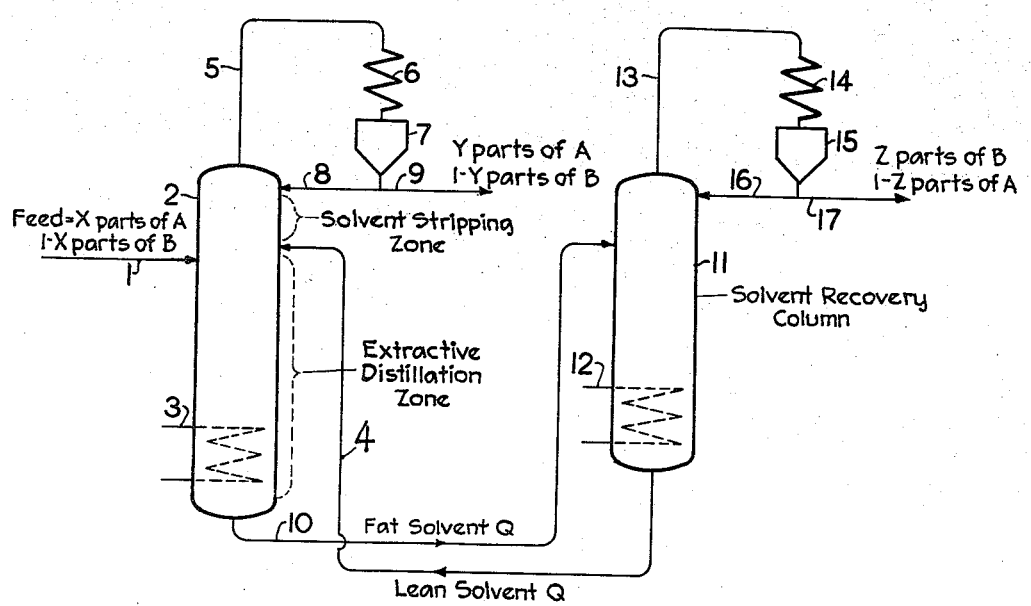
Fig. I
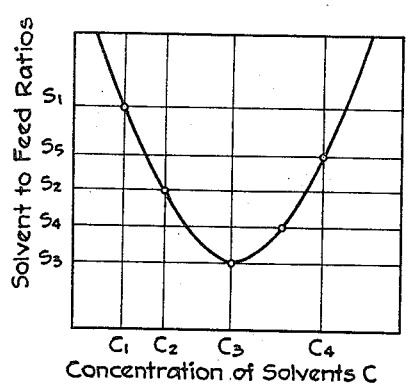
Fig. II
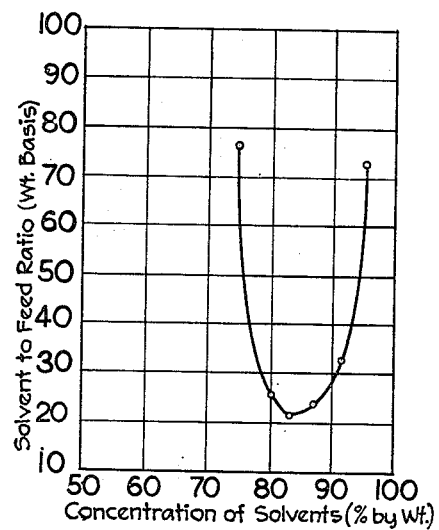
Fig. III
Inventor: Mott Souders Jr.
By his Attorney:

Patented June 26, 1945

2,379,110

UNITED STATES PATENT OFFICE 2,379,110

DISTILLATION PROCESS

Mott Souders, Jr., Piedmont, Calif., assignor to Shell Development Company, San Francisco, Calif., a corporation of Delaware Application July 1, 1942, Serial No. 449,348

2 Claims. (Cl. 202—41)

The present invention relates to a method for separating components of mixtures by distillation. More particularly, it relates to distillation processes wherein components are separated by distillation in the presence of a relatively high boiling selective solvent.

The process of extractive distillation wherein mixtures of components are separated by distillation in the presence of relatively high boiling solvents which alter the normal vapor pressure relationships in a manner to aid separation has been successfully applied to the separation of components which possess vapor pressures so similar that their separation is difficult or even impossible in the absence of a relatively high boiling selective solvent or azeotrope-former.

Unfortunately, heretofore such separations have been poorly understood and as a result the application of such processes has depended wholly upon empirical methods. Still further, this factor has hindered the wider application of this otherwise eminently suitable and widely applicable separation method.

It has been known for some time that the presence of a relatively high boiling selective solvent will markedly alter the vapor pressure of the component selectively dissolved as compared to that of the less soluble component. As a result this phenomenon may be employed to further accentuate or even reverse the vapor pressure relationships existing between the components it is desired to separate. The less soluble component is distilled overhead, while the more soluble component is withdrawn along with solvent as a bottom product. It has been further known that in general this vapor pressure altering effect could be increased by increasing the solvent concentration. Keeping these principles in mind and adding the well known teaching of the distillation art, where it has long been recognized that for a given separation in a column equivalent to a given number of theoretical plates an increase in reflux ratio increases the degree of separation attainable, it is not surprising that heretofore both large reflux ratios and high solvent-to-feed ratios have been applied in sometimes unsuccessful and frequently uneconomical attempts to apply extractive distillation to large scale commercial separation problems.

I have now discovered that these heretofore accepted principles applying to extractive distillation are not altogether true; for example, I have found that increased reflux beyond a certain critical value can be as harmful to a given separation as the failure to supply reflux up to a certain critical value. I have discovered that to attain the most efficient and economical mode of operation it is necessary carefully to control and correlate the solvent and reflux rates in the manner hereinafter more fully described.

It is an object of my invention to provide an improved extractive distillation process. It is another object to provide a method for operating extractive distillation processes in the most efficient and economical manner. Further objects will be apparent from the following.

The present invention comprises a method for operating an extractive distillation system wherein the reflux-to-feed ratio, the solvent-to-feed ratio, and the solvent concentration are so correlated as to result in over-all optimum efficiency, as hereinafter more fully described.

It is desired to separate a feed mixture of $X$ parts of component $A$ and $1-X$ parts of component $B$ which normally have vapor pressures, or activities, so similar as to make their separation difficult by simple distillation in the absence of an azeotrope-former or selective solvent for one of the components.

It is proposed to carry out the separation by continuously distilling the mixture in the presence of a relatively high boiling selective solvent $Q$ for component $B$ in a system represented by Fig. I which is a flow diagram thereof.

Referring to Fig. I, a feed mixture of components $A$ and $B$ (each of which may be a mixture or a pure compound) is fed via line 1 to column 2 equipped with reboiler 3 and operated at pressure $P$. Solvent $Q$ is to be admitted to column 2 via line 4 and flowed down the extractive distillation zone of column 2, i. e. the portion of column 2 below solvent inlet 4 which contains a number of actual plates equivalent to $N$ theoretical plates, solvent $Q$ exerting its vapor pressure-altering effect on component $B$ and selectively dissolving it from ascending vapors flowing countercurrently thereto.

Vapors rich in component $A$ pass overhead via line 5 to condenser 6. Condensed vapors collect in accumulator 7 whence a portion of the overhead is returned as reflux via line 8 while the top product is withdrawn via line 9 and passed to storage not shown. The portion of column 2 between reflux inlet 8 and solvent inlet 4 is the stripping section and is to be equivalent to a sufficient number of theoretical plates so that with the reflux-to-feed ratio $R$ employed solvent will be prevented from passing overhead with the top product. In some cases it is desirable to make this stripping section a separate column.

At the outset of the problem, be it postulated that the feed mixture of $X$ parts of $A$ and $1-X$ parts of $B$ be separated into a top product of $Y$ parts of $A$ and $1-Y$ parts of $B$, while the bottom product is to be composed of $Z$ parts of $A$ and $1-Z$ parts of $B$. Therefore column 2 is to be operated so that a bottom product consisting of $Z$ parts of $A$ and $1-Z$ parts of $B$ (on a solvent-free basis) be withdrawn in solution of the solvent from the bottom of column 2 and pass via line 10 to solvent recovery column 11 equipped with reboiler 12.

Lean solvent Q is withdrawn from the bottom of column 11 and is recycled via line 4 to column 2 at a solvent-to-feed weight ratio of S to contact further quantities in subsequent cycles. Vapors of the solute pass overhead from column 11 through line 13 to condenser 14. Condensate collects in accumulator 15 whence a portion is returned to column 11 as reflux via line 16, while the remainder passes to storage not shown.

The problem is to find the optimum solvent concentration (C) and the optimum ratios of solvent-to-feed (S) and reflux-to-feed (R) which will produce the most efficient and economical separation set forth above, meeting the postulated conditions. To determine these optimum ratios proceed as follows:

First step

Determine experimentally the relative volatility of A to B in the presence of various concentrations of solvent Q.

In most separations of substances closely related chemically, e. g. hydrocarbons differing only in degree of saturation, the relative volatilities in the presence of solvent do not vary appreciably with changes in the relative concentrations of A and B in the mixture. For such separations it is only necessary to measure the relative volatilities of A to B for some convenient concentration (e. g. a 50–50 mixture of A and B) for a series of different solvent concentrations C. In such cases it is convenient to measure the relative volatility of A to B in this 50–50 mixture and express this value as the "alpha value," i. e. the equilibrium ratio of vapor concentration to liquid concentration for component A, divided by the similar ratio for component B.

In cases where the relative volatility of components A and B varies appreciably with changes in their own relative concentration, it is usually necessary to determine the relative volatility for a series of mixtures containing different relative concentrations of A and B and each series with different concentrations of solvent. In some cases average $\alpha$ values may be employed or the data may be plotted and included in the McCabe & Thiele diagram.

In any case, to determine the relative volatilities, an appropriate mixture of components and solvent is boiled at the pressure P under equilibrium conditions and samples of the vapor and liquid withdrawn. These samples are analyzed to determine the concentration of one of the components in the vapor, as compared to its concentration in the liquid with which the vapor is in equilibrium. Special apparatus and techniques have been devised for conveniently determining relative volatilities (e. g. see Ind. Eng. Chem., Anal. ed., vol. 4, pp. 232–234 (1932)).

From the above measurements a series of relative volatility values (alpha values) are related to the various concentrations thus:

$\alpha_1$ corresponding to concentration $C_1$
$\alpha_2$ corresponding to concentration $C_2$
$\alpha_3$ correspondng to concentration $C_3$
$\alpha_4$ corresponding to concentration $C_4$
$\alpha_5$ corresponding to concentration $C_5$, etc.

Second step

From each of the above alpha values the corresponding minimum reflux ratio R is determined.

The minimum reflux ratios necessary to give the required separation with the given extractive distillation zone of N plates is determined for each of the above alpha values.

This relationship may be determined by the method of Smoker (Transactions American Institute of Chemical Engineers, vol. 34, p. 165 (1938)), where the alpha values are independent of the relative proportions of A to B; or according to the graphical Method of McCable and Thiele (Ind. Eng. Chem., vol. 17, p. 605 (1925)). For each of the above determined alpha values a corresponding minimum reflux ratio is thus obtained:

$R_1$ corresponding to $\alpha_1$
$R_2$ corresponding to $\alpha_2$
$R_3$ corresponding to $\alpha_3$
$R_4$ corresponding to $\alpha_4$
$R_5$ corresponding to $\alpha_5$

Third step

The solvent-feed rate necessary to maintain the solvent concentrations corresponding to the above calculated reflux ratios is determined.

This value is determined by substituting the above values in the formula $$S = \frac{CR}{1-C}$$

Thus a series of values of S are determined corresponding to the various concentrations of solvent C thus:

$S_1$ corresponding to $C_1$
$S_2$ corresponding to $C_2$
$S_3$ corresponding to $C_3$
$S_4$ corresponding to $C_4$
$S_5$ corresponding to $C_5$

Fourth step

Determine the minimum solvent ratio from the above data.

Plotting of the various values of S vs. C is a convenient way to determine this minimum as is illustrated by Fig. II which is a graph derived by such a plot. From Fig. II it is seen that the minimum solvent-to-feed ratio is $S_3$.

According to the present invention the optimum solvent concentration, and solvent and reflux ratios to apply in the above separation are the values corresponding to the above minimum, that is, $C_3$, $S_3$ and $R_3$, respectively. Accordingly, the extractive distillation process described in the drawing is operated with solvent-to-feed ratios, solvent concentrations, and reflux rates near values corresponding to the minimum available solvent-to-feed ratio.

Of course, it is not necessary to plot the above values; frequently the minimum value can be located by simple inspection of the data, preferably in tabular form.

EXAMPLE

It is desired to separate a feed containing 48.5% beta-butylene and 51.5% butadiene by extractive distillation in a distillation system similar to the one described in Fig. I, employing an 83% acetone–17% water mixture as solvent. It is required that the overhead product consist of 98% beta-butylene and that 98% of the beta-butylene in the feed be recovered as top product. The bottom product comprising butadiene dissolved in solvent is to be withdrawn from the first column and stripped from solvent in a second distillation column. It is decided to employ an extractive distillation column having an extractive distillation section (that is, the section between the solvent feed port and the reboiler) equivalent to 60 equilibrium plates. This column is to be operated at 120 pounds per sq. in. pressure absolute. It is required to find those solvent-to-feed and reflux-to-feed ratios which will result in the most economical operation (based on heating, cooling and pumping costs) and at the same time allow the required recovery and degree of separation of beta-butylene and butadiene.

These optimum values are determined as follows: The alpha values for mixtures of beta-butylene and butadiene are not appreciably influenced by changes in their relative proportions. Therefore, a series of mixtures corresponding to feed composition (48.5% beta-butylene and 51.5% butadiene) containing various proportions of solvent were made up and the relative volatilities determined.

The measurements were made at 120 lbs. per sq. in. pressure absolute and the alpha values were calculated for each of these mixtures. Results are tabulated in columns 1 and 2 of the table.

For each of these alpha values the minimum reflux required to obtain a given separation in a 60 plate column was determined by the method of Smoker. These values are tabulated in column 3 of the table.

By substitution in the formula $$S = \frac{CR}{1-C}$$

wherein $S$=the solvent-to-feed ratio on weight basis, $C$=parts of solvent per part of solvent feed mixture (weight basis), and $R$=the minimum reflux-to-feed ratio for a 60 plate column, to attain the given separation, the solvent ratios corresponding to the above concentrations were calculated and are tabulated in column 4 of the table. From the values in the table the concentration of solvent was plotted as abscissas vs. the corresponding solvent-to-feed ratios, plotted as ordinates, to give the graph of Fig. III. In accordance with these data the extractive distillation column is to be operated with a solvent-to-feed ratio of about 21.2 parts of solvent per part of feed by weight, and at the corresponding reflux-to-feed ratio of about 4.5 parts of reflux per part of feed.

mum point of the curve because in general in extractive distillation processes the greatest expense is met in stripping and recirculating the solvent. Thus, in the above example, the optimum solvent-to-feed ratio lies between about 21.2 and 22.6 and the reflux-to-feed ratio lies between about 4.8 to 4.0. Moreover, contrary to the well-known teaching of the distillation art, it is not possible to improve the separation by increasing the reflux when operating with minimum solvent, since additional reflux reduces the solvent concentration and lowers the alpha value.

It will be understood that in any given case and locality, differences exist in the cost of heat, cooling water, pumping, etc., and thus it is impossible to state exactly the most economical relation between reflux and solvent ratios where the minima of the two do not coincide. However, in general, I have found that the most economical conditions correspond to some value equal to or slightly greater than that value corresponding to the minimum solvent-to-feed ratio available (values below the minimum solvent-to-feed ratio will not permit the given separation to be attained). In accordance with these facts it will be realized that a certain amount of leeway must be given in choosing the final most economical conditions, and in some cases it may be desirable to choose to operate at some solvent-to-feed ratio and corresponding solvent concentration and reflux-to-feed ratio which is somewhat greater than the minimum, e. g. up to about 1.5 times the minimum. However, other things being equal, if a value greater than the minimum is chosen it is best to select a value on the side of said minimum which goes with a lower reflux ratio.

I claim as my invention:

1. In an extractive distillation process for the separation of a vaporizable mixture of two components comprising contacting said mixture with a high boiling selective solvent for one of said components in an extractive distillation column having a given number of plates and provided with a reflux; the method of operating said column comprising maintaining a reflux to feed ratio $R$ and maintaining a solvent to feed ratio $S$ such that the relationship between $S$ and $R$ is $$S = \frac{CR}{1-C}$$

wherein $C$ is the concentration of the solvent in

Table

| Weight per cent solvent (83% $CH_3COCH_3$+17% $H_2O$) in solvent feed (48.5% β butylene+51.5% butadiene) mixture | $\alpha = \dfrac{\text{Conc. }\beta\text{-butylene in vapor}}{\text{Conc. }\beta\text{-butylene in liquid}} \div \dfrac{\text{Conc. butadiene in vapor}}{\text{Conc. butadiene in liquid}}$ at B. P. 120# p. s. i. and equilibrium | Minimum reflux-to-feed ratio sufficient to meet required conditions for 60 eqlbm. plate ext. dstn. zone (wt. basis) | Solvent-to-feed ratio necessary to maintain given solvent concentration |
|---|---|---|---|
| 75.0 | 1.16 | 25.0 | 75 |
| 80.0 | 1.23 | 6.3 | 25.2 |
| 82.5 | 1.27 | 4.5 | 21.2 |
| 85.0 | 1.29 | 4.0 | 22.6 |
| 87.5 | 1.30 | 3.8 | 26.6 |
| 90.0 | 1.31 | 3.6 | 32.4 |
| 95.0 | 1.31 | 3.6 | 68.5 |

From a consideration of the above example it will be evident that all the solvent-to-feed ratios and corresponding reflux-to-feed ratios and solvent concentrations, tabulated above, when employed in the given distillation zone will suffice to attain the required separation. But it is also quite evident that certain conditions are quite preferable to others, and as I have pointed out, the optimum conditions correspond to the minithe column such that the volatility ratio between the two components is substantially the minimum to permit their separation with said number of plates and said reflux to feed ratio.

2. The method according to claim 1 wherein the solvent to feed ratio is less than 1.5 times the minimum operative solvent to feed ratio as shown in Fig. II.

MOTT SOUDERS, JR.